US011864113B2

(12) United States Patent
Meylan et al.

(10) Patent No.: US 11,864,113 B2
(45) Date of Patent: Jan. 2, 2024

(54) TECHNIQUES FOR REDUCING WAKEUP LATENCY

(71) Applicant: QUALCOMM Incorporated, San Diego, CA (US)

(72) Inventors: Arnaud Meylan, San Diego, CA (US); Rissen Alfonso Joseph, San Diego, CA (US); Yogesh Kumar Sadhu, San Diego, CA (US); Nishith Chaubey, San Diego, CA (US); Vaishakh Rao, San Diego, CA (US); Alok Mitra, San Diego, CA (US); Aravindh Suriyamoorthy, San Diego, CA (US); Vinod Vijayarajan, Longmont, CO (US); Vinesh Tarphe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/482,211

(22) Filed: Sep. 22, 2021

(65) Prior Publication Data

US 2023/0109306 A1 Apr. 6, 2023

(51) Int. Cl.
*H04W 52/02* (2009.01)
*H04W 84/12* (2009.01)

(52) U.S. Cl.
CPC ... *H04W 52/0229* (2013.01); *H04W 52/0216* (2013.01); *H04W 52/0274* (2013.01); *H04W 84/12* (2013.01)

(58) Field of Classification Search
CPC ......... H04W 52/0229; H04W 52/0274; H04W 84/12; H04W 76/28; H04W 40/005; H04N 23/651
See application file for complete search history.

(56) References Cited

U.S. PATENT DOCUMENTS

2013/0322260 A1* 12/2013 Yao ................. H04W 24/10
370/241
2016/0174280 A1 6/2016 Singh et al.
(Continued)

FOREIGN PATENT DOCUMENTS

WO WO-2017123288 A1 7/2017

OTHER PUBLICATIONS

International Search Report and Written Opinion—PCT/US2022/041542—ISA/EPO—dated Dec. 15, 2022.

*Primary Examiner* — Omer S Mian

(74) *Attorney, Agent, or Firm* — Holland & Hart LLP

(57) ABSTRACT

Methods, systems, and devices for wireless communication are described. A data layer at a user equipment (UE) may provide information associated with an uplink message to a modem power manager to determine whether to keep resources which are brought up by the scheduler or to power them off for transmitting the uplink message. For example, the data layer may indicate a radio access technology, a subscriber identifier, and a bearer type associated with the uplink message, which may enable the modem power manager to identify which radios to wake up (e.g., or avoid putting to sleep). Utilizing the information may enable the modem power manager to determine whether the wakeup is related to uplink data, acquire information to support the wakeup with resources indicated by the information, and avoid putting resources to sleep if the scheduled and the unscheduled wakeup resource requirements match.

28 Claims, 9 Drawing Sheets

(56) References Cited

U.S. PATENT DOCUMENTS

| | | | | |
|---|---|---|---|---|
| 2020/0322854 A1* | 10/2020 | Ryoo | ................ | H04W 36/0085 |
| 2021/0409514 A1* | 12/2021 | Westberg | ................ | H04L 67/34 |
| 2022/0141645 A1* | 5/2022 | Koo | ........................ | H04W 8/22 |
| | | | | 455/418 |
| 2022/0216959 A1* | 7/2022 | Teyeb | ................... | H04W 76/25 |

* cited by examiner

TECHNIQUES FOR REDUCING WAKEUP LATENCY

TECHNICAL FIELD

The following relates to wireless communication, including techniques for reducing wakeup latency.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (for example, operatively, communicatively, functionally, electronically, and/or electrically) to each other.

In some wireless communications systems, a UE may operate in a discontinuous reception (DRX) mode. However, in some cases, existing DRX techniques may be deficient.

SUMMARY

The described techniques relate to improved methods, systems, devices, and apparatuses that support techniques for reducing wakeup latency. Generally, the described techniques provide for improving wakeup procedures at a user equipment (UE) by improving cooperation between components. For example, a data layer at the UE may provide information associated with an uplink message to a modem power manager to enable the modem power manager to keep resources up for transmitting the uplink message. The data layer may indicate a radio access technology, a subscriber identifier (ID), and a bearer type (e.g., a cell group, such as a master cell group (MCG) or a secondary cell group (SCG)) associated with the uplink message, which may enable the modem power manager to identify which radios to wake up (e.g., or avoid putting to sleep) to reduce latency and improve resource utilization at the UE. Utilizing the information may enable the modem power manager to determine whether the wakeup is related to uplink data, acquire information to support the wakeup with resources indicated by the information, and avoid second guessing which resources to wake up and which resources to put to sleep, which may improve network reliability, user experience, power consumption, and overall network efficiency.

A method for wireless communication at a user equipment (UE) is described. The method may include obtaining, at a modem power manager of the UE and from a data layer of the UE as part of a modem wakeup event, an identification of one or more radio access technologies to be used for transmission of an uplink message associated with the modem wakeup event, determining, at the modem power manager and based on the identification, a radio access technology configuration which indicates the one or more radio access technologies to be used for the transmission of the uplink message, and indicating, from the modem power manager and to a resource scheduler for the UE, radio access technology activation and deactivation instructions based on the radio access technology configuration.

An apparatus for wireless communication at a UE is described. The apparatus may include at least one processor, and memory coupled (e.g., operatively, communicatively, functionally, electronically, or electrically) with the at least one processor, the memory storing instructions executable by the at least one processor to cause the apparatus to obtain, at a modem power manager of the UE and from a data layer of the UE as part of a modem wakeup event, an identification of one or more radio access technologies to be used for transmission of an uplink message associated with the modem wakeup event, determine, at the modem power manager and based on the identification, a radio access technology configuration which indicates the one or more radio access technologies to be used for the transmission of the uplink message, and indicate, from the modem power manager and to a resource scheduler for the UE, radio access technology activation and deactivation instructions based on the radio access technology configuration.

Another apparatus for wireless communication at a UE is described. The apparatus may include means for obtaining, at a modem power manager of the UE and from a data layer of the UE as part of a modem wakeup event, an identification of one or more radio access technologies to be used for transmission of an uplink message associated with the modem wakeup event, means for determining, at the modem power manager and based on the identification, a radio access technology configuration which indicates the one or more radio access technologies to be used for the transmission of the uplink message, and means for indicating, from the modem power manager and to a resource scheduler for the UE, radio access technology activation and deactivation instructions based on the radio access technology configuration.

A non-transitory computer-readable medium storing code for wireless communication at a UE is described. The code may include instructions executable by at least one processor to obtain, at a modem power manager of the UE and from a data layer of the UE as part of a modem wakeup event, an identification of one or more radio access technologies to be used for transmission of an uplink message associated with the modem wakeup event, determine, at the modem power manager and based on the identification, a radio access technology configuration which indicates the one or more radio access technologies to be used for the transmission of the uplink message, and indicate, from the modem power manager and to a resource scheduler for the UE, radio access technology activation and deactivation instructions based on the radio access technology configuration.

Some examples of the method, apparatuses, and non-transitory computer-readable medium described herein may further include operations, features, means, or instructions for obtaining, from the data layer and as part of the modem wakeup event, a second identification of a subscriber identifier, a bearer type, a radio link control path, or any combination thereof, to be used for the transmission of the uplink message, where the radio access technology configuration may be further determined based on the second identification.

In some examples of the method, apparatuses, and non-transitory computer-readable medium described herein, the radio access technology configuration indicates the subscriber identifier, the bearer type, the radio link control path, or any combination thereof, to be used for the transmission of the uplink message.

Some examples of the method, apparatuses, and non-transitory computer-readable medium described herein may further include operations, features, means, or instructions for indicating an activation signal to the data layer so that the data layer, in response to modem wakeup events, identifies to the modem power manager the one or more radio access technologies.

Some examples of the method, apparatuses, and non-transitory computer-readable medium described herein may further include operations, features, means, or instructions for indicating a deactivation signal to the data layer so that the data layer, in response to modem wakeup events, refrains from identifying to the modem power manager the one or more radio access technologies.

Some examples of the method, apparatuses, and non-transitory computer-readable medium described herein may further include operations, features, means, or instructions for obtaining the identification of the one or more radio access technologies to be used for transmission of the uplink message associated with the modem wakeup event occurs when the modem wakeup event interrupts a radio of the UE that may be in a sleep state of a discontinuous reception mode and the radio may be associated with the modem power manager.

In some examples of the method, apparatuses, and non-transitory computer-readable medium described herein, the radio access technology activation and deactivation instructions include first instructions to activate a first one or more radios of the UE, second instructions to deactivate a second one or more radios of the UE, third instructions to maintain a respective activation state for each radio of a third one or more radios of the UE, or any combination thereof.

In some examples of the method, apparatuses, and non-transitory computer-readable medium described herein, the identification includes a first radio access technology and a first bearer type for a first cell group and a second radio access technology and a second bearer type for a second cell group.

In some examples of the method, apparatuses, and non-transitory computer-readable medium described herein, the first cell group includes a master cell group and the second cell group includes a secondary cell group.

In some examples of the method, apparatuses, and non-transitory computer-readable medium described herein, the first cell group may be associated with a first frequency range and the second cell group may be associated with a second frequency range.

Some examples of the method, apparatuses, and non-transitory computer-readable medium described herein may further include operations, features, means, or instructions for transmitting the uplink message using the one or more radio access technologies in accordance with the radio access technology configuration.

In some examples of the method, apparatuses, and non-transitory computer-readable medium described herein, the one or more radio access technologies include a Long Term Evolution (LTE) system, a New Radio (NR) system a wireless local area network (WLAN) system, or any combination thereof.

DETAILED DESCRIPTION

Figure 1:
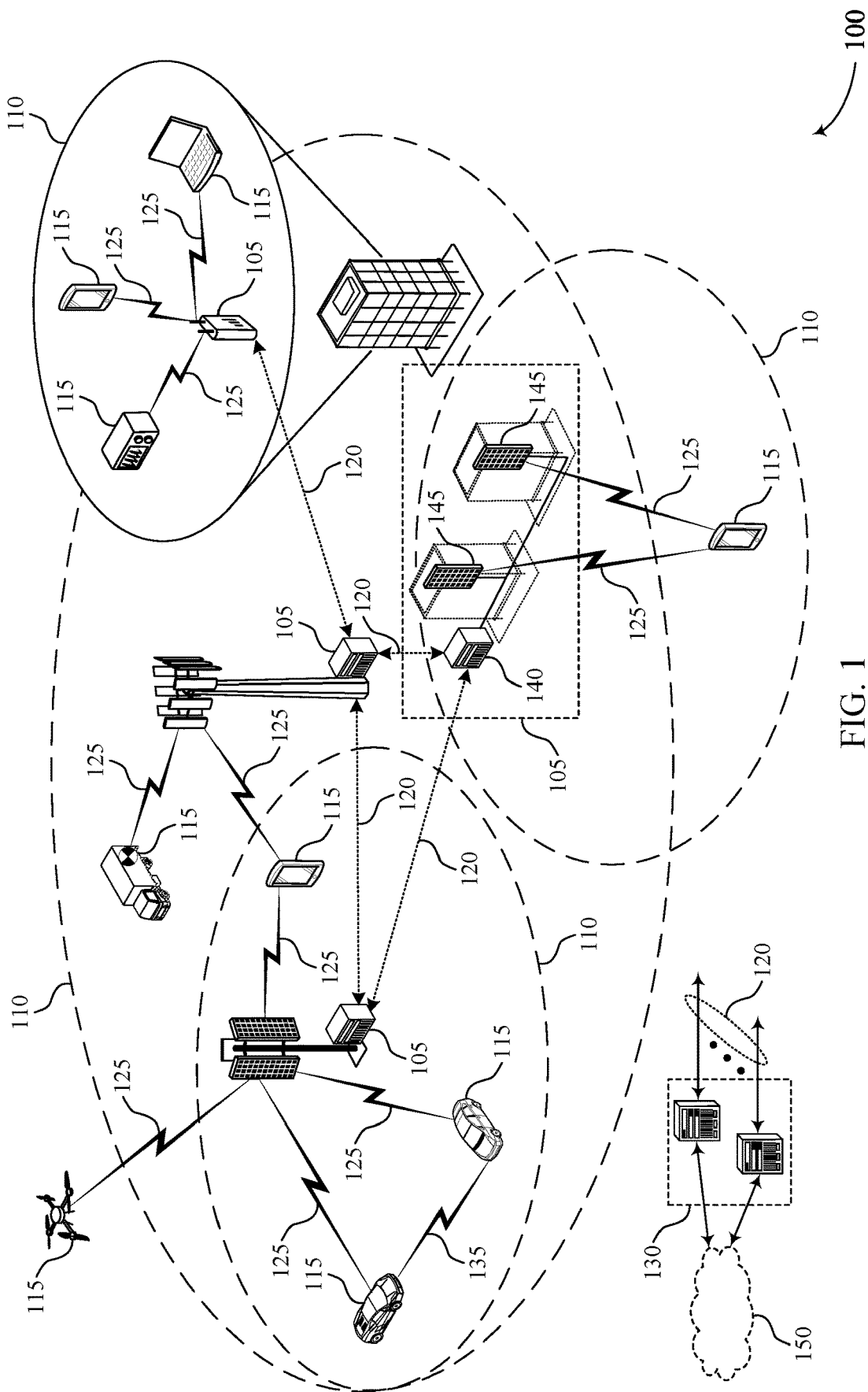
FIG. 1 illustrates an example of a wireless communications system that supports techniques for reducing wakeup latency in accordance with aspects of the present disclosure.

In some wireless communications systems, a user equipment (UE) may operate in a discontinuous reception (DRX) mode. When operating in a DRX mode, the UE may perform one or more procedures to reduce power consumption. For example, a modem power manager at the UE may put a modem at the UE to sleep when the modem is not in use. Additionally, the modem may utilize one or more techniques to perform scheduled wakeups that may be synchronized to scheduled messages (e.g., uplink messages) that the modem may process. In some cases, DRX wakeups are scheduled before the modem is powered down. In this case, the modem power manager may receive the time of the next modem activity, enabling the modem power manager to schedule resources to be brought up before the scheduled time (e.g., when the UE wakes up), and close to the wakeup time to save power.

In some examples, uplink traffic arriving at the modem while the modem is asleep may initiate an unexpected wakeup procedure, which may be referred to as a "rude" wakeup procedure. As the modem wakeup is unexpected, a scheduler which manages resources for use at the modem may make resources available (e.g., bring up the resources). In some examples, the scheduler may not identify the uplink traffic arriving at the modem, and trigger a bring down procedure (e.g., bring down the resources) to save power. While this process may be efficient for unexpected wakeups that are not intended to utilize modem resources, it may result in increased latency when an unexpected wakeup is indeed meant for the modem. To service the modem related unexpected wakeup, the scheduler may bring the resources back up again. This up-down-up procedure may cause an additional delay in processing (e.g., 1-2 milliseconds (ms)), which may lead to reduced performance and power efficiency.

Aspects of the present disclosure may enable cross-module cooperation to enhance handling an unexpected wakeup at the modem and efficiently determine that the wakeup is meant for the modem. For example, aspects of the disclosure describe techniques to avoid power rails within the UE turning on, then off, then on again. In some cases, the data layer may provide to the modem power manager an uplink traffic indication with information (e.g., metadata) to enable the modem power manager to keep resources up to support wakeups while avoiding an up-down-up procedure. The information may enable the modem power manager to determine which resources at the modem to bring up or maintain. Utilizing the information may enable the modem power manager to determine whether the wakeup is related to uplink traffic, acquire information to support the wakeup with resources indicated by the information, and avoid putting resources to sleep.

Aspects of the disclosure are initially described in the context of wireless communications systems. Aspects of the disclosure are further illustrated by and described with reference to a component diagram, apparatus diagrams, system diagrams, and flowcharts that relate to techniques for reducing wakeup latency.

FIG. 1 illustrates an example of a wireless communications system 100 that supports techniques for reducing wakeup latency in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities, such as a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a modem power manager at a UE 115 may perform one or more procedures to conserve power resources during communications (e.g., while the UE 115 operates in a DRX mode). That is, the modem power manager may put a modem at the UE 115 to sleep when the modem is not in use, and wakeup the modem for a scheduled data packet transmission (e.g., uplink data). However, in some cases, uplink traffic coming to the modem (e.g., from a data layer of the UE 115) while the modem is asleep may trigger an unexpected wakeup procedure.

Aspects of the present disclosure may enable cross-module cooperation to enhance handling an unexpected wakeup at the modem and efficiently determine that the wakeup is meant for the modem. For example, aspects of the disclosure describe techniques to avoid power rails within the UE 115 turning on, then off, then on again. In some cases, the data layer may provide to the modem power manager an uplink traffic indication with information (e.g., metadata) to enable the modem power manager to keep resources up to support wakeups while avoiding an up-down-up procedure. For example, the data layer may indicate a radio access technology, a subscriber identifier (ID), a bearer type (e.g., a cell group, such as a master cell group (MCG) or a secondary cell group (SCG)), or any combination thereof, associated with the uplink traffic, which may enable the modem power manager to identify which radios to wake up (or avoid putting to sleep) to reduce latency and improve resource utilization at the UE 115. The information may enable the power manager to determine whether the wakeup is related to uplink traffic, acquire information to support the wakeup with resources indicated by the information, and avoid putting resources to sleep.

Figure 2:
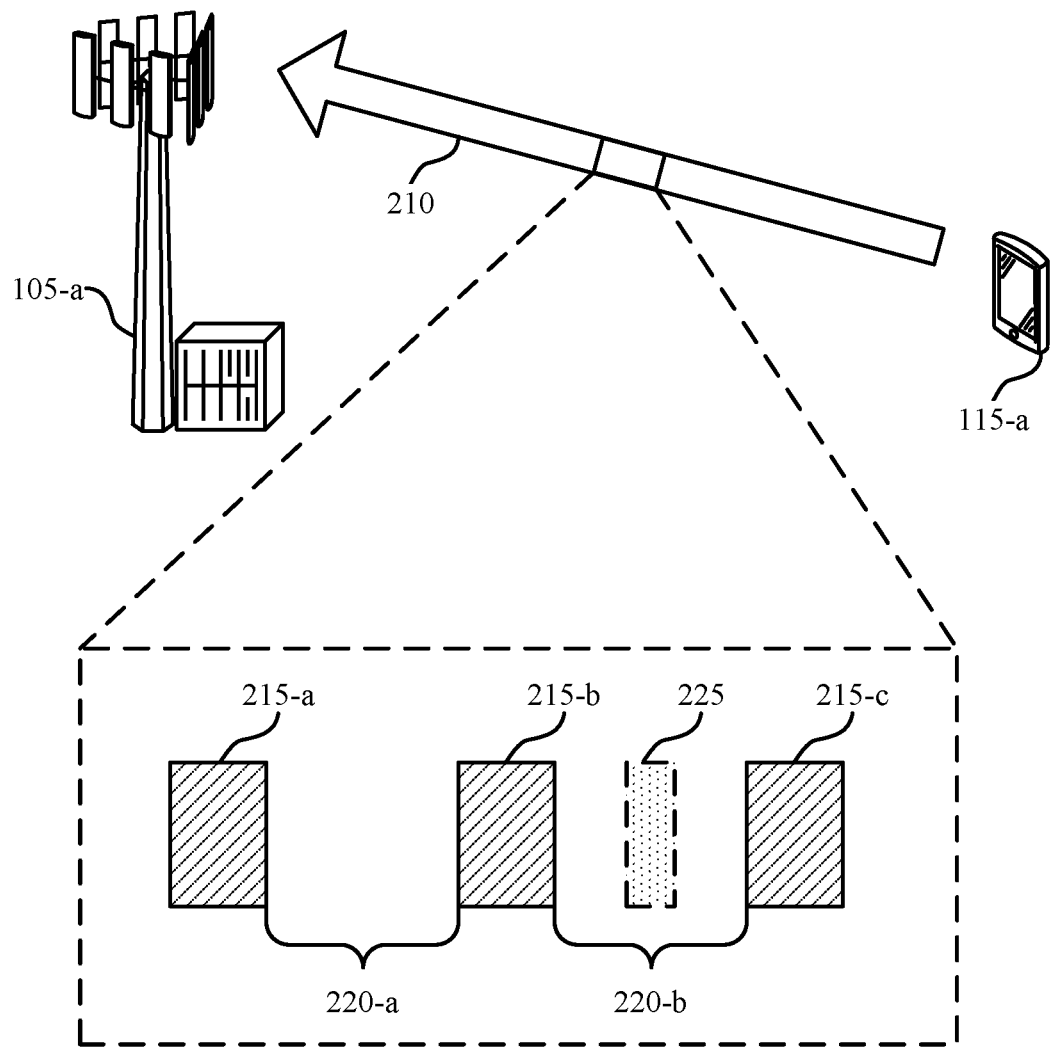
FIG. 2 illustrates an example of a wireless communications system that supports techniques for reducing wakeup latency in accordance with aspects of the present disclosure.

FIG. 2 illustrates an example of a wireless communications system 200 that supports techniques for reducing wakeup latency in accordance with aspects of the present disclosure. The wireless communications system 200 may include a base station 105-a and a UE 115-a, which may be examples of a base station 105 and a UE 115 as described with reference to FIG. 1. While operations and techniques may be discussed below as being performed by particular wireless devices, operations and techniques may be performed by any number of wireless devices as well as different wireless devices than those discussed below.

The base station 105-a and the UE 115-a may communicate over one or more communication links. For example, the UE 115-a may communicate with the base station 105-a via an uplink channel 210. In some cases, the UE 115-a may operate in a DRX mode. For example, the UE 115-a may sleep between scheduled transmissions (e.g., between periodic uplink signaling 215). The UE 115-a may receive information regarding scheduling enabling the UE 115-a to wake up for the periodic uplink signaling 215. That is, the UE 115-a may transmit a first periodic uplink signaling 215-a. Following the first periodic uplink signaling 215-a, the UE 115-a may sleep during a first sleep period 220-a. The UE 115-a may then perform a scheduled wakeup to transmit a second periodic uplink signaling 215-b. The UE 115-a may then sleep during a second sleep period 220-b, followed by another scheduled wakeup to transmit a periodic uplink signaling 215-c.

In some cases, however, the UE 115-a may obtain an unscheduled data message (e.g., uplink message 225) to transmit during a scheduled sleep period 220 (e.g., during a second sleep period 220-b, as illustrated in FIG. 2.) In such cases, the uplink message 225 may trigger an unexpected wakeup for a modem at the UE 115-a. That is, a modem power manager may detect the uplink message 225 during the second sleep period 220-b and subsequently perform an unscheduled wakeup of the modem at the UE 115-a. An unscheduled wakeup may involve making resources available (e.g., bringing up resources) for the unscheduled wakeup. In some examples, the resources may correspond to voltage rails of the modem at the UE 115-a, clocks associated with processors at the UE 115-a, or both. However, the modem power manager may not have adequate information regarding the uplink message 225, which may lead to a resource scheduler bringing down the resources to sleep the modem again. In some cases, after bringing down the resources, the modem, modem power manager, internet packet services (IPS), or some combination thereof, may determine that the unscheduled wakeup was indeed intended for the modem. This may result in the modem power manager bringing up resources again, causing an up-down-up procedure that may increase latency at the UE 115-a (e.g., 1-2 ms). For example, first ping packet latency may suffer long delays due to this up-down-up procedure.

As described herein, the UE 115-a may implement one or more techniques to avoid the up-down-up procedure associated with unexpected wakeups by adjusting an unexpected wakeup timeline. For example, the modem power manager may keep resources up when the modem power manager determines the unexpected wakeup is for uplink data associated with the modem at the UE 115-a. To keep resources up, the modem power manager may obtain information associated with what resources may be kept up to support traffic at the modem (e.g., an uplink traffic indication). In some examples, a data layer may provide information that enables the modem power manager to identify the uplink message 225 and determine the wakeup is meant for the modem.

For example, to determine what resources may be brought up to support transmitting the uplink message 225, the data layer may indicate information, such as a radio access technology, a subscriber ID, a bearer type (e.g., a cell group, such as an MCG, SCG, or split bearer), a primary technology for the bearer, or any combination thereof, which may be based on a PDCP associated with the uplink message 225. Put another way, the data layer, upon indicating the uplink message 225 to the modem (e.g., from at least one processor to the modem), may also determine which subscription ID, bearer, technology, etc., may be used to transmit the uplink message 225 (e.g., the data layer may post this real-time wakeup information). Obtaining this information may enable the modem power manager to identify which resources to wake up (e.g., or avoid putting to sleep) to reduce latency and improve resource utilization at the UE 115-a.

For example, upon proceeding with an unexpected wakeup, the modem power manager may determine if the wakeup is for uplink data, obtain information from the data layer to determine what resources support the uplink data, and avoid taking down resources (e.g., sleeping the modem), which avoids the modem having to wake up resources later, or a combination thereof. Additionally, the UE 115-a may utilize methods to moderate how often the data layer obtains the information to avoid consuming additional power resources.

In some examples, the uplink message 225 may include one or more data packets. In such cases, the data layer may provide to the modem power manager a union of the modem power manager resources from the several data packets and their associated bearers. That is, for each packet included in the unexpected wakeup, the data layer may determine the bearer (e.g., MCG, SCG, split bearer) and may use an IPS bearer mapping table to derive the resource requirements, such as Table 1.

TABLE 1

Info provided by IPS

| Bearer ID | Sub ID | DC Type | Bearer Type | PDCP primary path | Info derived by IPS Resources |
|---|---|---|---|---|---|
| SSIM case | | | | | |
| W1 | S1 | ENDC | MCG (LTE) | — | LTE |
| X1 | S1 | | SCG (NR) | — | NR |
| Y1 | S1 | | SPLIT | LTE | LTE |
| Z1 | S1 | | SPLIT | NR | NR |
| W2 | S1 | NRDC | MCG (NR) | — | NR |
| X2 | S1 | | SCG (NR) | — | NR |
| Y2 | S1 | | SPLIT | NR | NR |
| Z2 | S1 | | SPLIT | NR | NR |
| MSIM case | | | | | |
| W3 | S1 | ENDC | MCG (LTE) | — | LTE |
| X3 | S1 | | SCG (NR) | — | NR |
| Y3 | S1 | | SPLIT | LTE | LTE + NR |
| Z3 | S1 | | SPLIT | NR | NR |
| W4 | S1 | NRDC | MCG (NR) | — | NR |
| X4 | S1 | | SCG (NR) | — | NR |
| Y4 | S1 | | SPLIT | NR | NR |
| Z4 | S1 | | SPLIT | NR | NR |
| W3 | S2 | ENDC | MCG (LTE) | — | LTE |
| X3 | S2 | | SCG (NR) | — | NR |
| Y3 | S2 | | SPLIT | LTE | LTE + NR |
| Z3 | S2 | | SPLIT | NR | NR |
| W4 | S2 | NRDC | MCG (NR) | — | NR |
| X4 | S2 | | SCG (NR) | — | NR |
| Y4 | S2 | | SPLIT | NR | NR |
| Z4 | S2 | | SPLIT | NR | NR |

The IPS input to the modem power manager may be represented by the columns of Table 1. For example, the bearer ID may be indicated, along with a subscriber ID. Additionally, dual connectivity (DC) information may be provided (e.g., Evolved Universal Terrestrial Access Network (E-UTRAN) NR Dual Connectivity (ENDC), New Radio Dual Connectivity (NRDC)), bearer type (e.g., MCG, SCG, split) as well as a radio access technology associated with the bearer type (e.g., MCG (LTE)). Table 1 may also include the PDCP primary path as well as resources (e.g., tech-ups) associated with the PDCP primary path. In some examples, Table 1 may have separate rows for different subscriber identity module (SIM) arrangements. For example, Table 1 may have rows corresponding to single SIM (SSIM) and multiple SIM (MSIM) cases.

Resource requirements may correspond to a bearer type of MCG, a bearer type of SCG, or a split bearer type with a primary radio access technology (e.g., NR, LTE). In some examples, in an MSIM ENDC case, the primary radio access technology of the split bearer may correspond to LTE, and the resource requirements may include NR. For example, LTE may be associated with a long tune-away, during which the modem may leverage NR instead of LTE to reduce latency. Hence, to improve latency during LTE tune away, the modem power manager may also keep NR resources awake. In some cases, a secondary path associated with the bearer may not be utilized, as the techniques described herein may reduce latency for sparse traffic. Accordingly, in such cases, the modem power manager may not awaken the secondary path.

The described techniques may benefit wireless devices that may or may not operate at low power, low connectivity, asynchronously, or autonomously. For example, reduced power consumption and processing time may benefit devices and sensors in IoT arrangements, V2X systems, or any other wireless network where sparse communications are utilized.

Figure 3:
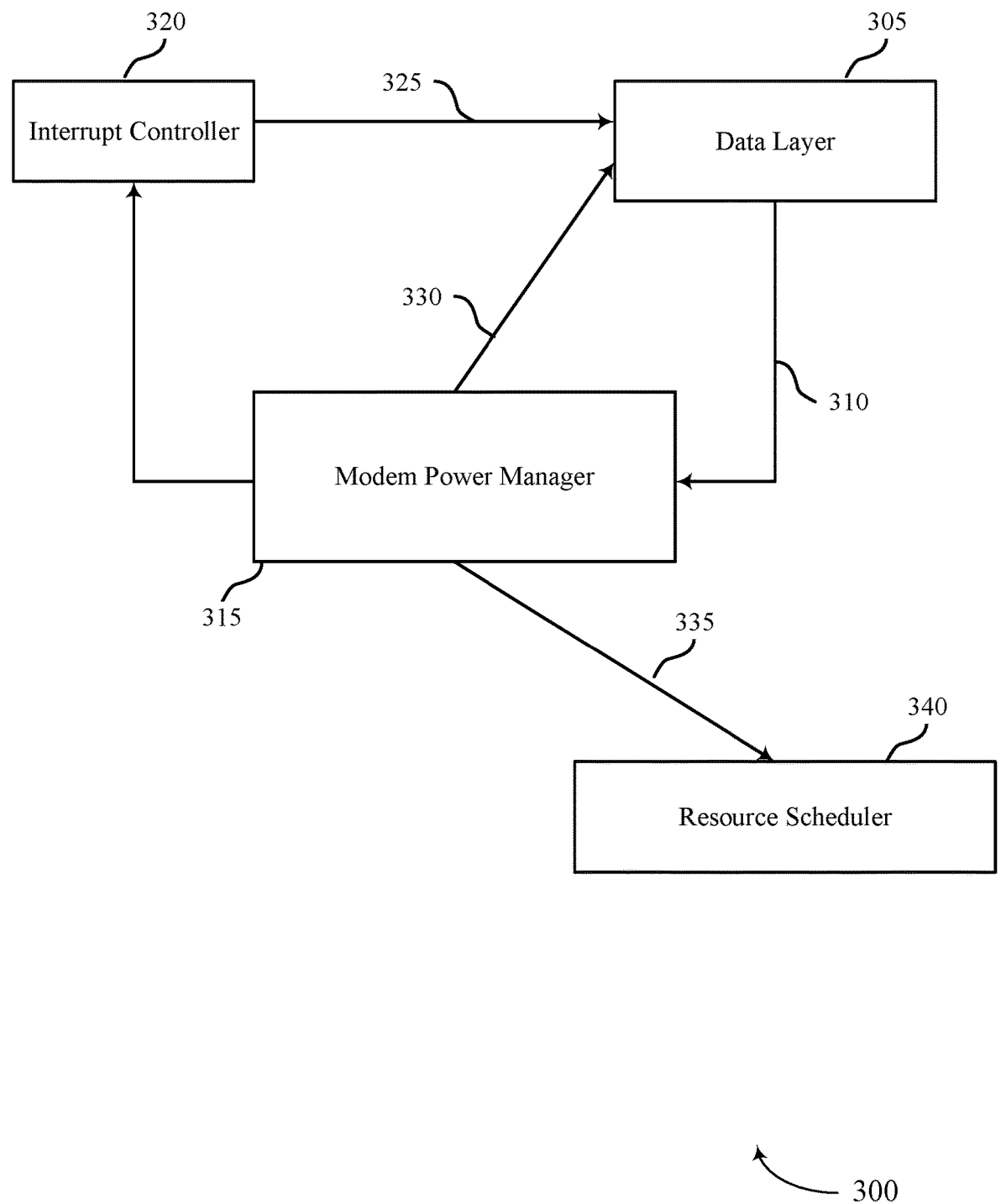
FIG. 3 illustrates an example of a component diagram that supports techniques for reducing wakeup latency in accordance with aspects of the present disclosure.

FIG. 3 illustrates an example of a component diagram 300 that supports techniques for reducing wakeup latency in accordance with aspects of the present disclosure. The component diagram 300 may include components of one or more wireless devices, such as a base station and a UE, which may be examples of a base station 105 and a UE 115 as described with reference to FIG. 1. For example, the component diagram 300 may include a data layer 305, a modem power manager 315, an interrupt controller 320, and a resource scheduler 340, which may be examples of components at a UE.

The data layer 305 may indicate a configuration upon bearer setup to support reduced latency rude wakeups. The data layer 305 may utilize one or more tables to map the resources to the modem power manager 315 to keep resources awake. For example, the data layer 305 may utilize entries from Table 2 corresponding to radio technologies for both MCG and SCG at the modem power manager 315, where the modem power manager 315 may be referred to as a power manager "PM" in Table 2. For example, the data layer 305 may identify a subscriber ID (e.g., 1 or 2), look up radio resources for MCG, and look up radio resources for SCG, if any.

TABLE 2

| | MCG | PM-radio-tech (MCG) | SCG | PM-radio-tech (SCG) |
|---|---|---|---|---|
| SUB1 | LTE | PM_LTE | n/a | |
| | NR | PM_NR | NR | PM_NR2 |
| SUB2 | LTE | PM_LTE1 | n/a | |
| | NR | PM_NR1 | NR | PM_NR3 |

The data layer 305 may provide uplink information 310 to the modem power manager 315, which may include a list of uplink radio resources (e.g., resources for MCG, resources for SCG), such as entries from Table 2. Based on the uplink information 310, the modem power manager 315 may identify uplink traffic to be transmitted at a modem.

The modem power manager 315 may provide a poke indication 330 to the data layer 305 to enable or disable poking (e.g., activation or deactivation of information to the modem power manager 315), where providing poke information may correspond to reduced latency corresponding to unexpected wakeups. Enabling or disabling poking may enable the modem power manager 315 to moderate the use of information during unexpected wakeups. For example, the modem power manager 315 may post "poke info needed=FALSE" when no connections (e.g., RRC connected radios) are in a sleep state or all radios are in RRC idle. Conversely, the modem power manager 315 may post "poke info needed=TRUE" when an RRC connected radio is in a DRX sleep state. Enabling poking may configure the data layer 305 to provide additional information to the modem power manager 315 when indicating an unexpected wakeup.

The modem power manager 315 may transmit an indication 335 to the resource scheduler 340 to bring down or keep up resources based at least in part on information provided by the data layer 305. The resource scheduler 340 may perform one or more actions based on the indication 335 from the modem power manager 315. For example, the resource scheduler 340 may maintain resources to support unexpected uplink traffic provided to the modem during a scheduled sleep if the poke indication 330 indicates that the same scheduled resources are to be used for the unexpected uplink traffic. After transmitting the uplink traffic associated with the unexpected wakeup, the modem at the UE may return to scheduled sleeps and wakeups.

In some examples, the modem power manager 315 may obtain a second unexpected wakeup to transmit additional uplink traffic. The interrupt controller 320 may transmit an uplink interrupt indication 325 to the data layer 305. Based on the uplink interrupt indication 325, the data layer 305 may obtain entries from Table 2 (e.g., or some other table corresponding to communications at the UE, such as Table 1 referenced in FIG. 2) to provide the uplink information 310 to the modem power manager 315, which may enable reduced wakeup latency by avoiding the up-down-up procedure.

Additionally or alternatively, the data layer 305 may moderate unexpected wakeup procedures. The modem may sleep after an inactivity timer (e.g., a DRX inactivity timer, which may have a duration of 10 ms). The data layer 305 may moderate and provide the uplink information 310, but not more often than once per inactivity timer (e.g., 10 ms). In some cases, the data layer 305 may utilize a longer time (e.g., 40 ms) to adapt to network conditions. In some examples, such as in NR, the UE may communicate with cell groups corresponding to different frequency ranges, including frequency ranges FR1 and FR2. For a given bearer, one cell group may awake for sparse traffic. The modem power manager 315 handling in such frequency ranges may be associated with a finer granularity and handle FR1 separately from FR2. In some cases, the modem power manager 315 may support multi-carrier (e.g., 8 component carriers (CCs) in FR2) for ping purposes. In some examples, the modem may support split bearers (e.g., select one or two radio resources to maintain). That is, the data layer 305 may determine split bearing and receive information regarding the split bearers via an RRC configuration. In some instances, when the resource scheduler 340 selects a radio resource, the modem may determine to use a non-primary PDCP leg based on that leg having an earlier scheduling request occasion. In some cases, such as when a buffer size plus a size of the uplink information 310 from the data layer 305 is above a threshold, the resource scheduler 340 may keep both radio resources awake to speed up scheduling requests on both bearers. In some cases, the resource scheduler 340 may bring up new resources which may not have been part of the scheduled wakeup (e.g., the scheduled wakeup corresponds to LTE, but packets may be transmitted over both LTE and NR, or it was for FR1 but may be transmitted over both FR1 and FR2).

Figure 4:
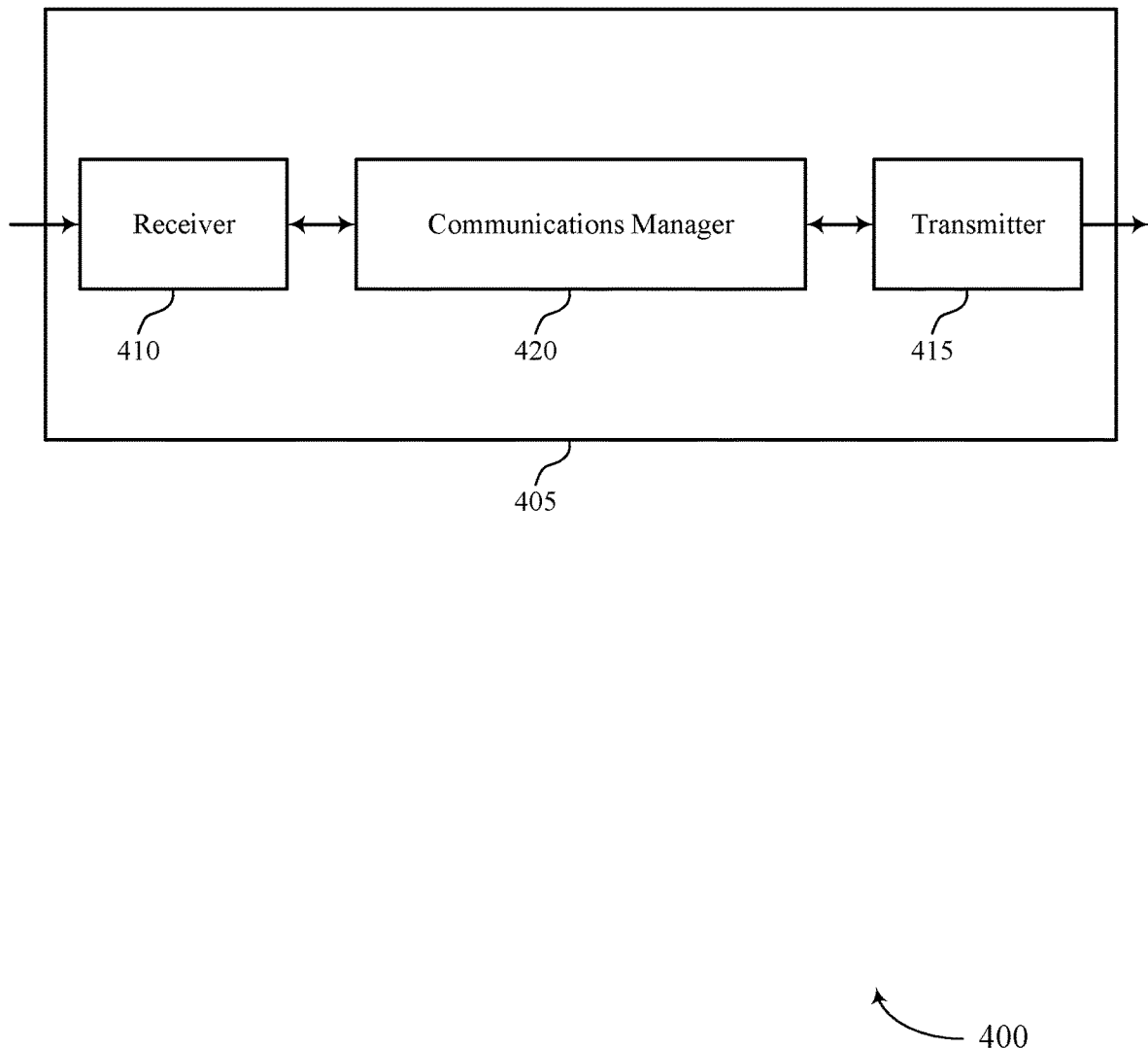
FIGS. 4 and 5 show block diagrams of devices that support techniques for reducing wakeup latency in accordance with aspects of the present disclosure.

FIG. 4 shows a block diagram 400 of a device 405 that supports techniques for reducing wakeup latency in accordance with aspects of the present disclosure. The device 405 may be an example of aspects of a UE 115 as described herein. The device 405 may include a receiver 410, a transmitter 415, and a communications manager 420. The device 405 may also include at least one processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for reducing wakeup latency). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for reducing wakeup latency). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for reducing wakeup latency as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in software (e.g., executed by at least one processor) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for obtaining, at a modem power manager of the UE and from a data layer of the UE as part of a modem wakeup event, an identification of one or more radio access technologies to be used for transmission of an uplink message associated with the modem wakeup event. The communications manager 420 may be configured as or otherwise support a means for determining, at the modem power manager and based on the identification, a radio access technology configuration which indicates the one or more radio access technologies to be used for the transmission of the uplink message. The communications manager 420 may be configured as or otherwise support a means for indicating, from the modem power manager and to a resource scheduler for the UE, radio access technology activation and deactivation instructions based on the radio access technology configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption, reduced processing, and reduced latency associated with computational tasks by leveraging information provided by the data layer to the modem power manager to manage unexpected wakeups.

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, firmware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Figure 5:
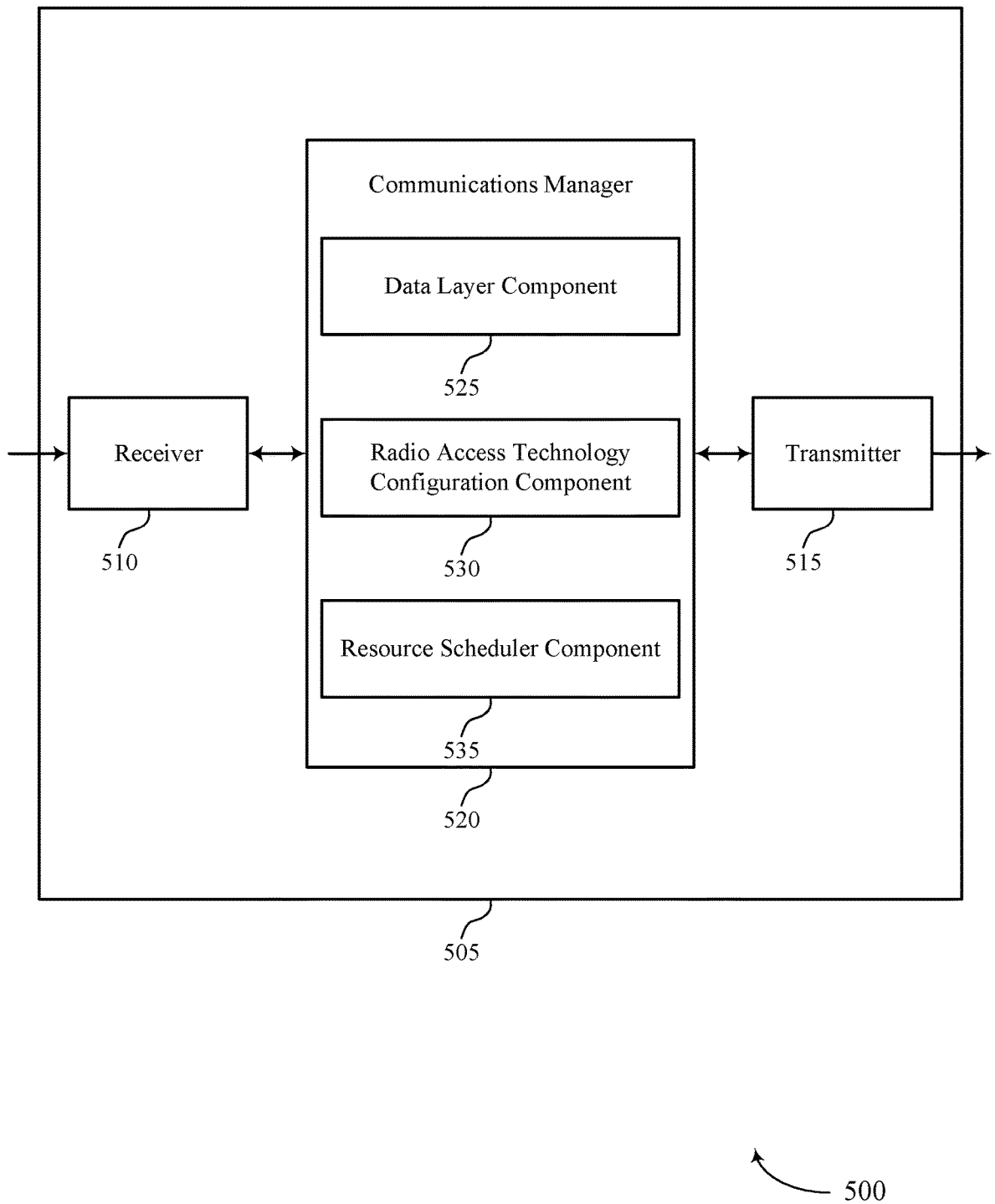

FIG. 5 shows a block diagram 500 of a device 505 that supports techniques for reducing wakeup latency in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reducing wakeup latency). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reducing wakeup latency). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for reducing wakeup latency as described herein. For example, the communications manager 520 may include a data layer component 525, a radio access technology configuration component 530, a resource scheduler component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The data layer component 525 may be configured as or otherwise support a means for obtaining, at a modem power manager of the UE and from a data layer of the UE as part of a modem wakeup event, an identification of one or more radio access technologies to be used for transmission of an uplink message associated with the modem wakeup event. The radio access technology configuration component 530 may be configured as or otherwise support a means for determining, at the modem power manager and based on the identification, a radio access technology configuration which indicates the one or more radio access technologies to be used for the transmission of the uplink message. The resource scheduler component 535 may be configured as or otherwise support a means for indicating, from the modem power manager and to a resource scheduler for the UE, radio access technology activation and deactivation instructions based on the radio access technology configuration.

Figure 6:
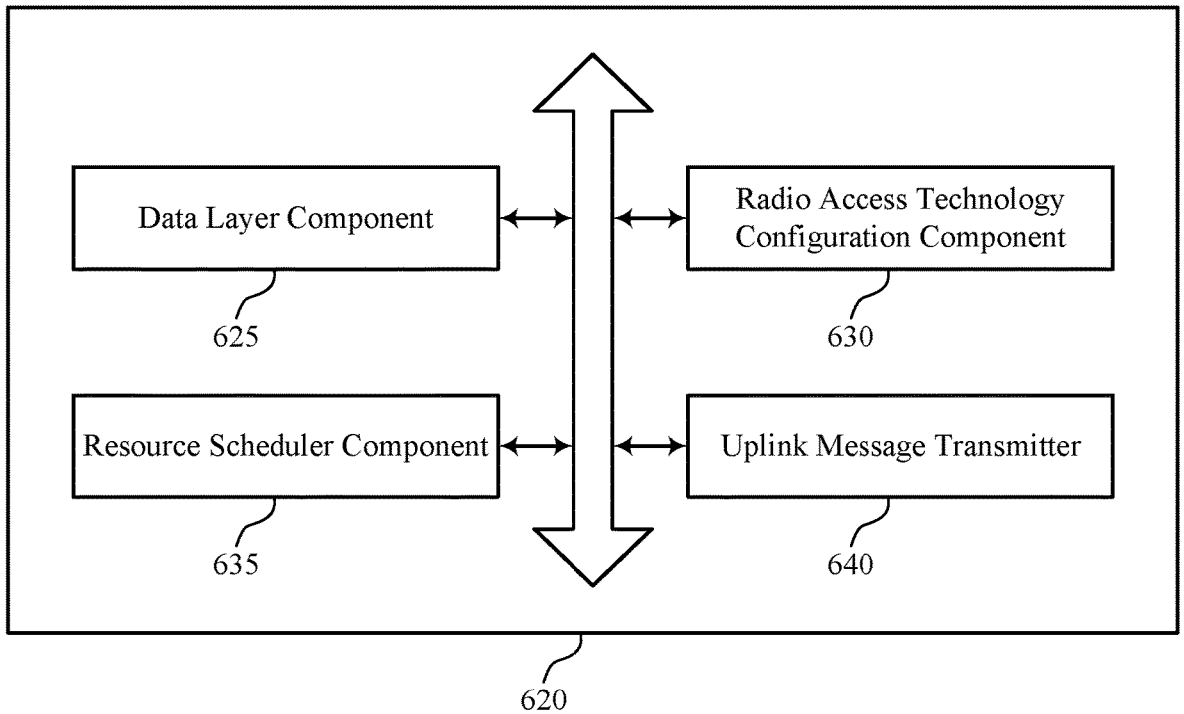
FIG. 6 shows a block diagram of a communications manager that supports techniques for reducing wakeup latency in accordance with aspects of the present disclosure.

FIG. 6 shows a block diagram 600 of a communications manager 620 that supports techniques for reducing wakeup latency in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for reducing wakeup latency as described herein. For example, the communications manager 620 may include a data layer component 625, a radio access technology configuration component 630, a resource scheduler component 635, an uplink message transmitter 640, or any combination thereof. Each of these components may communicate, directly or indirectly, with one another (e.g., via one or more buses).

The communications manager 620 may support wireless communication at a UE in accordance with examples as disclosed herein. The data layer component 625 may be configured as or otherwise support a means for obtaining, at a modem power manager of the UE and from a data layer of the UE as part of a modem wakeup event, an identification of one or more radio access technologies to be used for transmission of an uplink message associated with the modem wakeup event. The radio access technology configuration component 630 may be configured as or otherwise support a means for determining, at the modem power manager and based on the identification, a radio access technology configuration which indicates the one or more radio access technologies to be used for the transmission of the uplink message. The resource scheduler component 635 may be configured as or otherwise support a means for indicating, from the modem power manager and to a resource scheduler for the UE, radio access technology activation and deactivation instructions based on the radio access technology configuration.

In some examples, the data layer component 625 may be configured as or otherwise support a means for obtaining, from the data layer and as part of the modem wakeup event, a second identification of a subscriber identifier, a bearer type, a radio link control path, or any combination thereof, to be used for the transmission of the uplink message, where the radio access technology configuration is further determined based on the second identification.

In some examples, the radio access technology configuration indicates the subscriber identifier, the bearer type, the radio link control path, or any combination thereof, to be used for the transmission of the uplink message.

In some examples, the data layer component 625 may be configured as or otherwise support a means for indicating an activation signal to the data layer so that the data layer, in response to modem wakeup events, identifies to the modem power manager the one or more radio access technologies.

In some examples, the data layer component 625 may be configured as or otherwise support a means for indicating a deactivation signal to the data layer so that the data layer, in response to modem wakeup events, refrains from identifying to the modem power manager the one or more radio access technologies.

In some examples, obtaining the identification of the one or more radio access technologies to be used for transmission of the uplink message associated with the modem wakeup event occurs when the modem wakeup event interrupts a radio of the UE that is in a sleep state of a discontinuous reception mode. In some examples, the radio is associated with the modem power manager.

In some examples, the radio access technology activation and deactivation instructions include first instructions to activate a first one or more radios of the UE, second instructions to deactivate a second one or more radios of the UE, third instructions to maintain a respective activation state for each radio of a third one or more radios of the UE, or any combination thereof.

In some examples, the identification includes a first radio access technology and a first bearer type for a first cell group and a second radio access technology and a second bearer type for a second cell group.

In some examples, the first cell group includes a master cell group and the second cell group includes a secondary cell group.

In some examples, the first cell group is associated with a first frequency range and the second cell group is associated with a second frequency range.

In some examples, the uplink message transmitter 640 may be configured as or otherwise support a means for transmitting the uplink message using the one or more radio access technologies in accordance with the radio access technology configuration.

In some examples, the one or more radio access technologies include an LTE system, a New Radio (NR) system a WLAN system, or any combination thereof.

Figure 7:
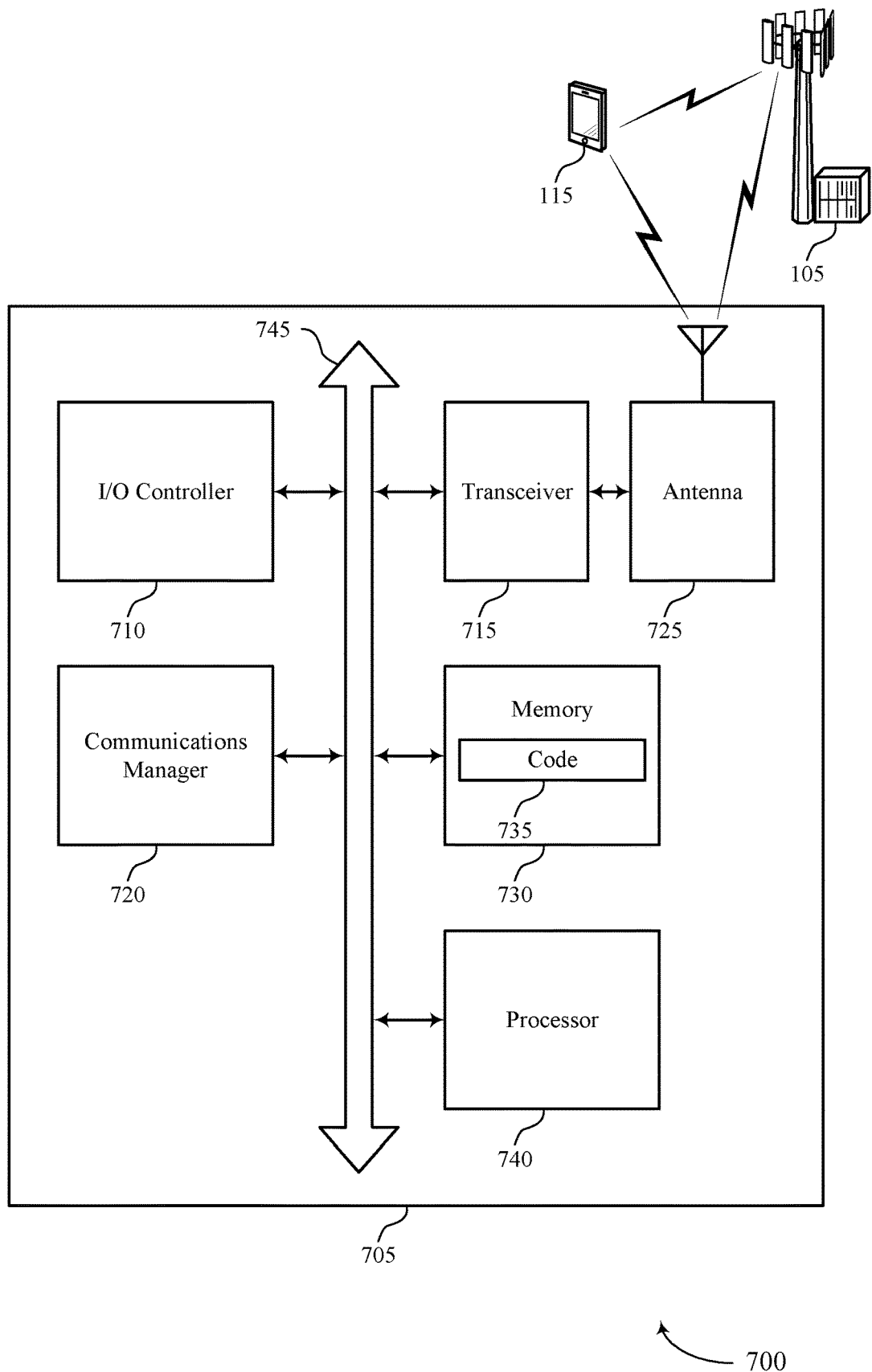
FIG. 7 shows a diagram of a system including a device that supports techniques for reducing wakeup latency in accordance with aspects of the present disclosure.

FIG. 7 shows a diagram of a system 700 including a device 705 that supports techniques for reducing wakeup latency in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for reducing wakeup latency). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for obtaining, at a modem power manager of the UE and from a data layer of the UE as part of a modem wakeup event, an identification of one or more radio access technologies to be used for transmission of an uplink message associated with the modem wakeup event. The communications manager 720 may be configured as or otherwise support a means for determining, at the modem power manager and based on the identification, a radio access technology configuration which indicates the one or more radio access technologies to be used for the transmission of the uplink message. The communications manager 720 may be configured as or otherwise support a means for indicating, from the modem power manager and to a resource scheduler for the UE, radio access technology activation and deactivation instructions based on the radio access technology configuration.

By including or configuring the communications manager 720 in accordance with examples as described herein, the device 705 may support techniques for improved communication reliability, reduced latency, improved user experience related to reduced processing time, more efficient utilization of communication resources, and improved utilization of processing capability by leveraging information provided by the data layer to the modem power manager to manage unexpected wakeups.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for reducing wakeup latency as described herein, or the processor 740 and the memory 730 may be otherwise configured to perform or support such operations.

Figure 8:
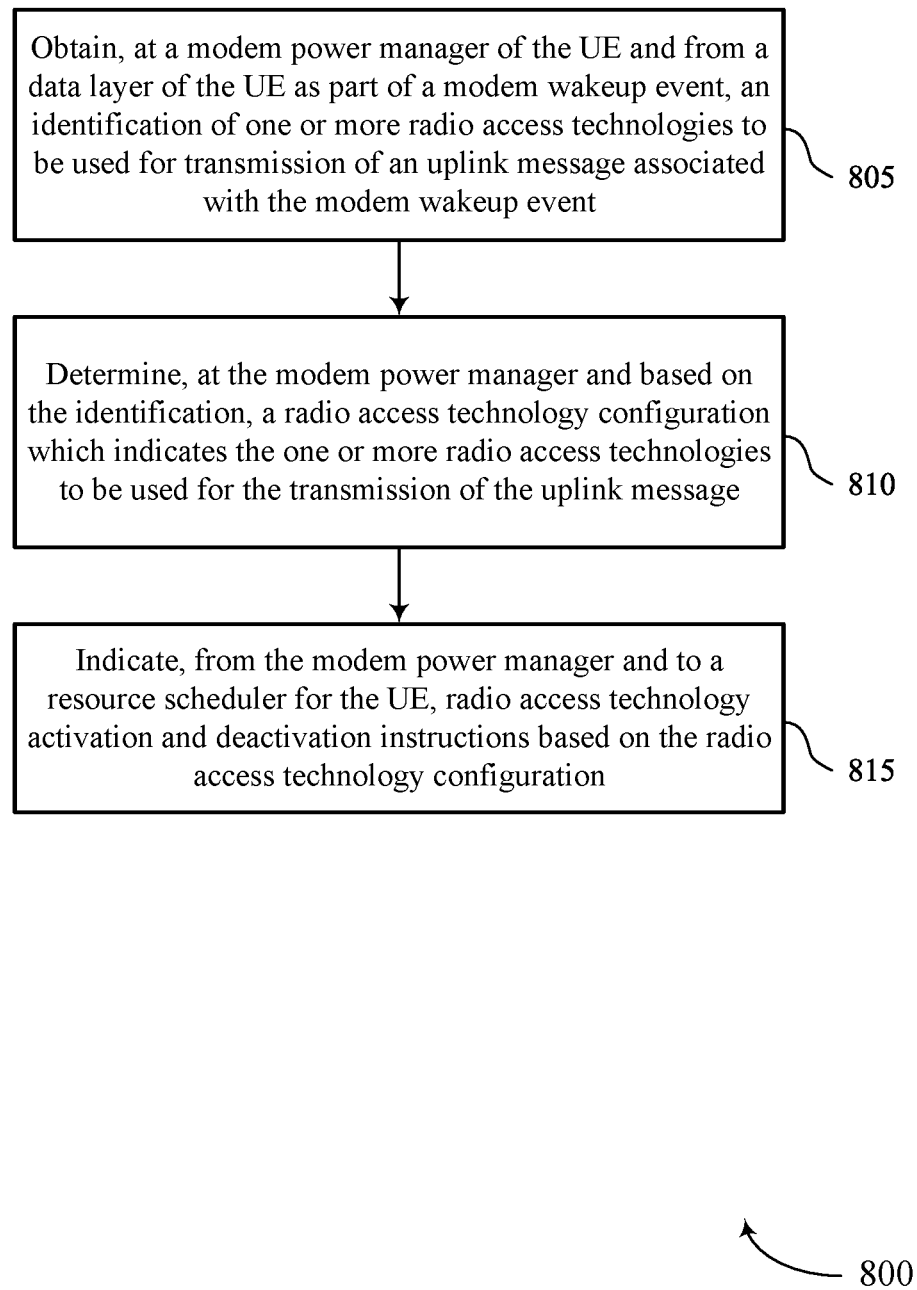
FIGS. 8 and 9 show flowcharts illustrating methods that support techniques for reducing wakeup latency in accordance with aspects of the present disclosure.

FIG. 8 shows a flowchart illustrating a method 800 that supports techniques for reducing wakeup latency in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include obtaining, at a modem power manager of the UE and from a data layer of the UE as part of a modem wakeup event, an identification of one or more radio access technologies to be used for transmission of an uplink message associated with the modem wakeup event. The operations of 805 may be performed in accordance with examples as disclosed herein. In some examples, aspects of the operations of 805 may be performed by a data layer component 625 as described with reference to FIG. 6.

At 810, the method may include determining, at the modem power manager and based at least in part on the identification, a radio access technology configuration which indicates the one or more radio access technologies to be used for the transmission of the uplink message. The operations of 810 may be performed in accordance with examples as disclosed herein. In some examples, aspects of the operations of 810 may be performed by a radio access technology configuration component 630 as described with reference to FIG. 6.

At 815, the method may include indicating, from the modem power manager and to a resource scheduler for the UE, radio access technology activation and deactivation instructions based at least in part on the radio access technology configuration. The operations of 815 may be performed in accordance with examples as disclosed herein. In some examples, aspects of the operations of 815 may be performed by a resource scheduler component 635 as described with reference to FIG. 6.

Figure 9:
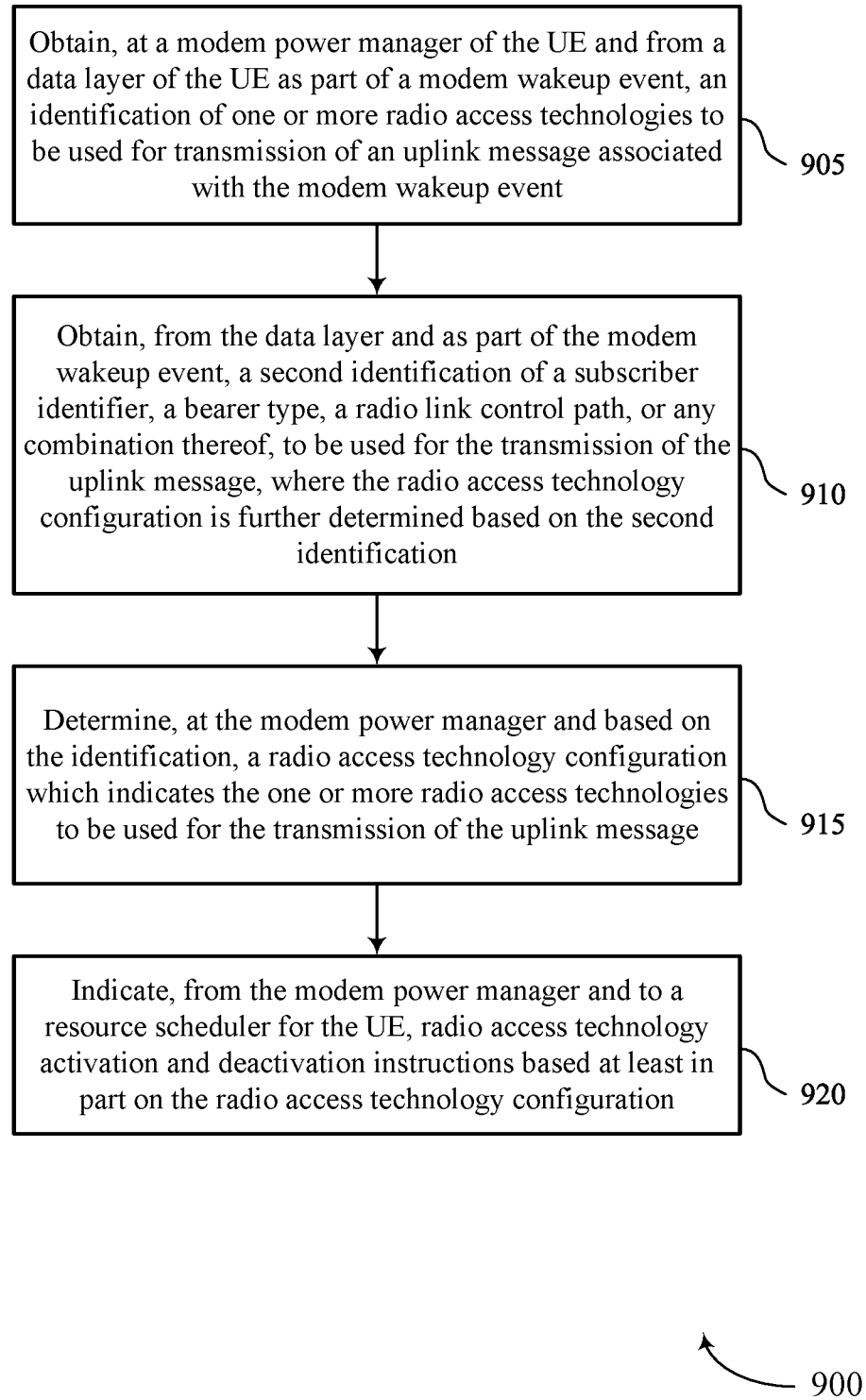

FIG. 9 shows a flowchart illustrating a method 900 that supports techniques for reducing wakeup latency in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include obtaining, at a modem power manager of the UE and from a data layer of the UE as part of a modem wakeup event, an identification of one or more radio access technologies to be used for transmission of an uplink message associated with the modem wakeup event. The operations of 905 may be performed in accordance with examples as disclosed herein. In some examples, aspects of the operations of 905 may be performed by a data layer component 625 as described with reference to FIG. 6.

At 910, the method may include obtaining, from the data layer and as part of the modem wakeup event, a second identification of a subscriber identifier, a bearer type, a radio link control path, or any combination thereof, to be used for the transmission of the uplink message, where the radio access technology configuration is further determined based at least in part on the second identification. The operations of 910 may be performed in accordance with examples as disclosed herein. In some examples, aspects of the operations of 910 may be performed by a data layer component 625 as described with reference to FIG. 6.

At 915, the method may include determining, at the modem power manager and based at least in part on the identification, a radio access technology configuration which indicates the one or more radio access technologies to be used for the transmission of the uplink message. The operations of 915 may be performed in accordance with examples as disclosed herein. In some examples, aspects of the operations of 915 may be performed by a radio access technology configuration component 630 as described with reference to FIG. 6.

At 920, the method may include indicating, from the modem power manager and to a resource scheduler for the UE, radio access technology activation and deactivation instructions based at least in part on the radio access technology configuration. The operations of 920 may be performed in accordance with examples as disclosed herein. In some examples, aspects of the operations of 920 may be performed by a resource scheduler component 635 as described with reference to FIG. 6.

The following provides an overview of aspects of the present disclosure:

Aspect 1: A method for wireless communication at a UE, comprising: obtaining, at a modem power manager of the UE and from a data layer of the UE as part of a modem wakeup event, an identification of one or more radio access technologies to be used for transmission of an uplink message associated with the modem wakeup event; determining, at the modem power manager and based at least in part on the identification, a radio access technology configuration which indicates the one or more radio access technologies to be used for the transmission of the uplink message; and indicating, from the modem power manager and to a resource scheduler for the UE, radio access technology activation and deactivation instructions based at least in part on the radio access technology configuration.

Aspect 2: The method of aspect 1, further comprising: obtaining, from the data layer and as part of the modem wakeup event, a second identification of a subscriber identifier, a bearer type, a radio link control path, or any combination thereof, to be used for the transmission of the uplink message, wherein the radio access technology configuration is further determined based at least in part on the second identification.

Aspect 3: The method of aspect 2, wherein the radio access technology configuration indicates the subscriber identifier, the bearer type, the radio link control path, or any combination thereof, to be used for the transmission of the uplink message.

Aspect 4: The method of any of aspects 1 through 3, further comprising: indicating an activation signal to the data layer so that the data layer, in response to modem wakeup events, identifies to the modem power manager the one or more radio access technologies.

Aspect 5: The method of any of aspects 1 through 4, further comprising: indicating a deactivation signal to the data layer so that the data layer, in response to modem wakeup events, refrains from identifying to the modem power manager the one or more radio access technologies.

Aspect 6: The method of any of aspects 1 through 5, wherein obtaining the identification of the one or more radio access technologies to be used for transmission of the uplink message associated with the modem wakeup event occurs when the modem wakeup event interrupts a radio of the UE that is in a sleep state of a discontinuous reception mode, the radio is associated with the modem power manager.

Aspect 7: The method of any of aspects 1 through 6, wherein the radio access technology activation and deactivation instructions comprise first instructions to activate a first one or more radios of the UE, second instructions to deactivate a second one or more radios of the UE, third instructions to maintain a respective activation state for each radio of a third one or more radios of the UE, or any combination thereof.

Aspect 8: The method of any of aspects 1 through 7, wherein the identification comprises a first radio access technology and a first bearer type for a first cell group and a second radio access technology and a second bearer type for a second cell group.

Aspect 9: The method of aspect 8, wherein the first cell group comprises a master cell group and the second cell group comprises a secondary cell group.

Aspect 10: The method of any of aspects 8 through 9, wherein the first cell group is associated with a first frequency range and the second cell group is associated with a second frequency range.

Aspect 11: The method of any of aspects 1 through 10, further comprising: transmitting the uplink message using the one or more radio access technologies in accordance with the radio access technology configuration.

Aspect 12: The method of any of aspects 1 through 11, wherein the one or more radio access technologies comprise an LTE system, a New Radio (NR) system a WLAN system, or any combination thereof.

Aspect 13: An apparatus for wireless communication at a UE, comprising at least one processor; and memory coupled with the at least one processor, the memory storing instructions executable by the at least one processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
obtaining, at a modem power manager of the UE and from a data layer of the UE as part of a modem wakeup event that interrupts a sleep state of a discontinuous reception mode, an identification of one or more radio access technologies to be used for transmission of an uplink message whose arrival at the data layer of the UE prior to the transmission of the uplink message triggers the modem wakeup event;
determining, at the modem power manager and based at least in part on the identification, a radio access technology configuration which indicates the one or more radio access technologies to be used for the transmission of the uplink message;
indicating, from the modem power manager and to a resource scheduler for the UE, radio access technology activation and deactivation instructions based at least in part on the radio access technology configuration; and transmitting the uplink message using the one or more radio access technologies indicated by the radio access technology configuration.

2. The method of claim 1, further comprising:

obtaining, from the data layer and as part of the modem wakeup event, a second identification of a subscriber identifier, a bearer type, a radio link control path, or any combination thereof, to be used for the transmission of the uplink message, wherein the radio access technology configuration is further determined based at least in part on the second identification.

3. The method of claim 2, wherein the radio access technology configuration indicates the subscriber identifier, the bearer type, the radio link control path, or any combination thereof, to be used for the transmission of the uplink message.

4. The method of claim 1, further comprising:

indicating an activation signal to the data layer so that the data layer, in response to modem wakeup events, identifies to the modem power manager the one or more radio access technologies.

5. The method of claim 1, further comprising:

indicating a deactivation signal to the data layer so that the data layer, in response to modem wakeup events, refrains from identifying to the modem power manager the one or more radio access technologies.

6. The method of claim 1, wherein:

obtaining the identification of the one or more radio access technologies to be used for transmission of the uplink message whose arrival at the data layer of the UE triggers the modem wakeup event occurs when the modem wakeup event interrupts a radio of the UE that is in the sleep state of the discontinuous reception mode, and the radio is associated with the modem power manager.

7. The method of claim 1, wherein the radio access technology activation and deactivation instructions comprise first instructions to activate a first one or more radios of the UE, second instructions to deactivate a second one or more radios of the UE, third instructions to maintain a respective activation state for each radio of a third one or more radios of the UE, or any combination thereof.

8. The method of claim 1, wherein the identification comprises a first radio access technology and a first bearer type for a first cell group and a second radio access technology and a second bearer type for a second cell group.

9. The method of claim 8, wherein the first cell group comprises a master cell group and the second cell group comprises a secondary cell group.

10. The method of claim 8, wherein the first cell group is associated with a first frequency range and the second cell group is associated with a second frequency range.

11. The method of claim 1, wherein the one or more radio access technologies comprise a Long Term Evolution (LTE) system, a New Radio (NR) system a wireless local area network (WLAN) system, or any combination thereof.

12. An apparatus for wireless communication at a user equipment (UE), comprising:

at least one processor; and memory coupled with the at least one processor, the memory storing instructions executable by the at least one processor to cause the apparatus to:

obtain, at a modem power manager of the UE and from a data layer of the UE as part of a modem wakeup event that interrupts a sleep state of a discontinuous reception mode, an identification of one or more radio access technologies to be used for transmission of an uplink message whose arrival at the data layer of the UE prior to the transmission of the uplink message triggers the modem wakeup event;

determine, at the modem power manager and based at least in part on the identification, a radio access technology configuration which indicates the one or more radio access technologies to be used for the transmission of the uplink message;

indicate, from the modem power manager and to a resource scheduler for the UE, radio access technology activation and deactivation instructions based at least in part on the radio access technology configuration; and transmit the uplink message using the one or more radio access technologies indicated by the radio access technology configuration.

13. The apparatus of claim 12, wherein the instructions are further executable by the at least one processor to cause the apparatus to:

obtain, from the data layer and as part of the modem wakeup event, a second identification of a subscriber identifier, a bearer type, a radio link control path, or any combination thereof, to be used for the transmission of the uplink message, wherein the radio access technology configuration is further determined based at least in part on the second identification.

14. The apparatus of claim 13, wherein the radio access technology configuration indicates the subscriber identifier, the bearer type, the radio link control path, or any combination thereof, to be used for the transmission of the uplink message.

15. The apparatus of claim 12, wherein the instructions are further executable by the at least one processor to cause the apparatus to:

indicate an activation signal to the data layer so that the data layer, in response to modem wakeup events, identifies to the modem power manager the one or more radio access technologies.

16. The apparatus of claim 12, wherein the instructions are further executable by the at least one processor to cause the apparatus to:

indicate a deactivation signal to the data layer so that the data layer, in response to modem wakeup events, refrains from identifying to the modem power manager the one or more radio access technologies.

17. The apparatus of claim 12, wherein:

obtaining the identification of the one or more radio access technologies to be used for transmission of the uplink message whose arrival at the data layer of the UE triggers the modem wakeup event occurs when the modem wakeup event interrupts a radio of the UE that is in the sleep state of the discontinuous reception mode, and the radio is associated with the modem power manager.

18. The apparatus of claim 12, wherein the radio access technology activation and deactivation instructions comprise first instructions to activate a first one or more radios of the UE, second instructions to deactivate a second one or more radios of the UE, third instructions to maintain a respective activation state for each radio of a third one or more radios of the UE, or any combination thereof.

19. The apparatus of claim 12, wherein the identification comprises a first radio access technology and a first bearer type for a first cell group and a second radio access technology and a second bearer type for a second cell group.

20. The apparatus of claim 19, wherein the first cell group comprises a master cell group and the second cell group comprises a secondary cell group.

21. The apparatus of claim 19, wherein the first cell group is associated with a first frequency range and the second cell group is associated with a second frequency range.

22. The apparatus of claim 12, wherein the one or more radio access technologies comprise a Long Term Evolution (LTE) system, a New Radio (NR) system a wireless local area network (WLAN) system, or any combination thereof.

23. An apparatus for wireless communication at a user equipment (UE), comprising:
means for obtaining, at a modem power manager of the UE and from a data layer of the UE as part of a modem wakeup event that interrupts a sleep state of a discontinuous reception mode, an identification of one or more radio access technologies to be used for transmission of an uplink message whose arrival at the data layer of the UE prior to the transmission of the uplink message triggers the modem wakeup event;
means for determining, at the modem power manager and based at least in part on the identification, a radio access technology configuration which indicates the one or more radio access technologies to be used for the transmission of the uplink message;
means for indicating, from the modem power manager and to a resource scheduler for the UE, radio access technology activation and deactivation instructions based at least in part on the radio access technology configuration; and
means for transmitting the uplink message using the one or more radio access technologies indicated by the radio access technology configuration.

24. The apparatus of claim 23, further comprising:
means for obtaining, from the data layer and as part of the modem wakeup event, a second identification of a subscriber identifier, a bearer type, a radio link control path, or any combination thereof, to be used for the transmission of the uplink message, wherein the radio access technology configuration is further determined based at least in part on the second identification.

25. The apparatus of claim 24, wherein the radio access technology configuration indicates the subscriber identifier, the bearer type, the radio link control path, or any combination thereof, to be used for the transmission of the uplink message.

26. The apparatus of claim 23, further comprising:
means for indicating an activation signal to the data layer so that the data layer, in response to modem wakeup events, identifies to the modem power manager the one or more radio access technologies.

27. The apparatus of claim 23, further comprising:
means for indicating a deactivation signal to the data layer so that the data layer, in response to modem wakeup events, refrains from identifying to the modem power manager the one or more radio access technologies.

28. A non-transitory computer-readable medium storing code for wireless communication at a user equipment (UE), the code comprising instructions executable by at least one processor to:
obtain, at a modem power manager of the UE and from a data layer of the UE as part of a modem wakeup event that interrupts a sleep state of a discontinuous reception mode, an identification of one or more radio access technologies to be used for transmission of an uplink message whose arrival at the data layer of the UE prior to the transmission of the uplink message triggers the modem wakeup event;
determine, at the modem power manager and based at least in part on the identification, a radio access technology configuration which indicates the one or more radio access technologies to be used for the transmission of the uplink message;
indicate, from the modem power manager and to a resource scheduler for the UE, radio access technology activation and deactivation instructions based at least in part on the radio access technology configuration; and
transmit the uplink message using the one or more radio access technologies indicated by the radio access technology configuration.

* * * * *